(12) United States Patent
Lueck et al.

(10) Patent No.: US 7,346,506 B2
(45) Date of Patent: Mar. 18, 2008

(54) SYSTEM AND METHOD FOR SYNCHRONIZED TEXT DISPLAY AND AUDIO PLAYBACK

(75) Inventors: Michael F. Lueck, Kitchener (CA); Robert A. Lowe, Waterloo (CA); Steven R. Van Dokkumburg, Waterloo (CA)

(73) Assignee: Agfa Inc., Toronto (CA)

( * ) Notice: Subject to any disclaimer, the term of this patent is extended or adjusted under 35 U.S.C. 154(b) by 860 days.

(21) Appl. No.: 10/681,428

(22) Filed: Oct. 8, 2003

(65) Prior Publication Data

US 2005/0080633 A1 Apr. 14, 2005

(51) Int. Cl.
*G10L 15/00* (2006.01)

(52) U.S. Cl. ...................... 704/235; 704/260

(58) Field of Classification Search ............. 704/235, 704/260
See application file for complete search history.

(56) References Cited

U.S. PATENT DOCUMENTS

| | | | |
|---|---|---|---|
| 4,449,190 A * | 5/1984 | Flanagan et al. ............. 706/22 |
| 5,031,113 A | 7/1991 | Hollerbauer | |
| 5,649,060 A * | 7/1997 | Ellozy et al. ................ 704/278 |
| 6,076,059 A * | 6/2000 | Glickman et al. ........... 704/260 |
| 6,260,011 B1 * | 7/2001 | Heckerman et al. ........ 704/235 |
| 6,366,882 B1 | 4/2002 | Bijl et al. | |
| 6,457,031 B1 | 9/2002 | Hanson | |
| 6,496,799 B1 | 12/2002 | Pickering | |

OTHER PUBLICATIONS

L.M. De Brujin et al., Speech Interfacing for Diagnosis Reporting Systems: An Overview.

* cited by examiner

*Primary Examiner*—Daniel Abebe
(74) *Attorney, Agent, or Firm*—Bereskin & Parr; Isis E. Caulder

(57) ABSTRACT

An audio processing system and method for providing synchronized display of recognized text from an original audio file and playback of the original audio file. The system includes a speech recognition module, a silence insertion module, and a silence detection module. The speech recognition module generates text and audio pieces. The silence insertion module, aggregates the audio pieces into an aggregated audio file. The silence detection module converts the original audio file and the aggregated audio file into silence detected versions. Silent and non-silent blocks are identified using a threshold volume. The silence insertion module compares the silence detected original and aggregated audio files, determines the differences in position of non-silence elements and inserts silence within the audio pieces accordingly. The characteristics of the silence inserted audio pieces are used to synchronize the display of recognized text from an original audio file and playback of original audio file.

20 Claims, 12 Drawing Sheets

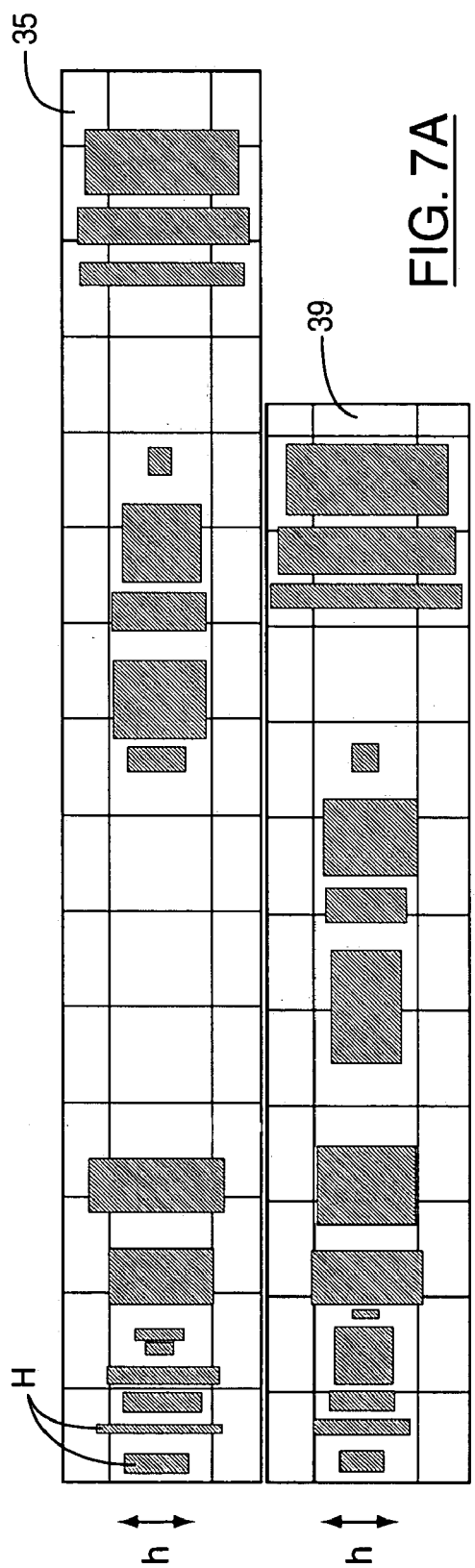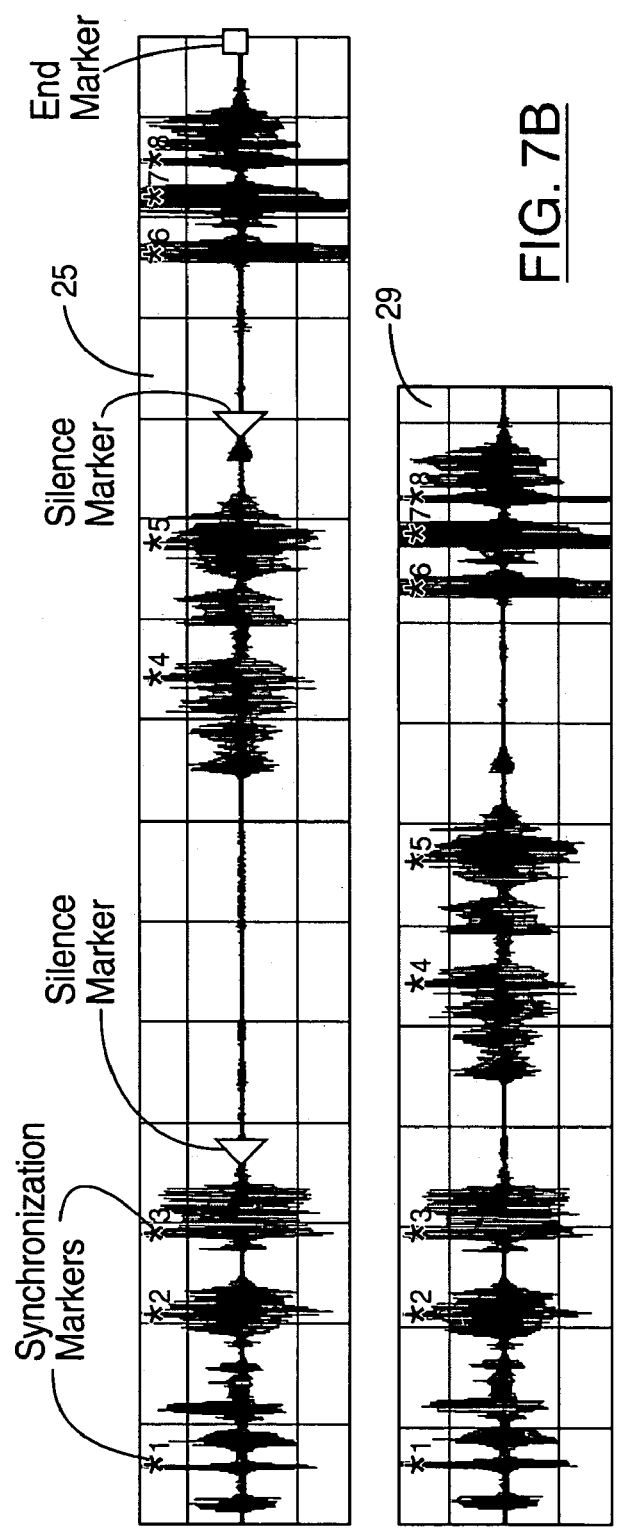

SYSTEM AND METHOD FOR SYNCHRONIZED TEXT DISPLAY AND AUDIO PLAYBACK

FIELD OF THE INVENTION

This invention relates generally to the field of speech recognition and more particularly to synchronized text display and audio playback for proofreading purposes.

BACKGROUND OF THE INVENTION

A proofreader in a speech recognition system plays both audio and text on a word-by-word basis to facilitate proofreading and correction of the text document. As the words are played, the user has the option to halt playback and modify or otherwise correct the portions of interest Many commercial products provide visual cues to the user in association with the text as the audio is being played back to assist the user to identify mistakes in the transcription. For example, U.S. Pat. No. 5,031,113 discloses a system that highlights a word when the associated audio is being played back. However, systems like this do not perform well in the case of an unrecognized word. In such a case, since only a single word is highlighted at a time, when there is an unrecognized word, nothing will be highlighted, which will cause a user to lose their place in the text.

Further, in most applications the alignment algorithms used to provide audio and text alignment have substantial limitations. For example, EasePublisher™ manufactured by Dolphin Audio Publishing of the United Kingdom, has synchronous audio/text playback. While they boast importing of audio into text "SYNC as you hear", or "SYNC as you speak", each of these functions requires the user to manually specify the synchronization points. Also, the LSM™ product manufactured by Sprex, Inc. of Seattle Wash., U.S.A., provides audio and plain text files to a server. This mechanism is undesirable since it is important to have an accurate text representation of the audio provided.

SUMMARY OF THE INVENTION

The invention provides in one aspect, an audio processing system for providing synchronized display of recognized text from an original audio file containing speech spoken by a user and playback of the original audio file, said system comprising:
   (a) a speech recognition module for generating recognized text pieces and associated audio pieces from the original audio file;
   (b) a silence insertion module for aggregating the audio pieces into an aggregated audio file;
   (c) a silence detection module for converting the original audio file and the aggregated audio file into a silence detected original audio file and a silence detected aggregated audio file, wherein silent and non-silent groups are identified using a threshold volume;
   (d) said silence insertion module further being adapted to:
      (i) compare the silence detected original audio file with the silence detected aggregated audio file and determine the differences in position of the non-silence group within the respective files;
      (ii) insert silence within the audio pieces according to the differences in position determined in (i) to create silence inserted audio pieces, such that aggregation of the silence inserted audio pieces results in an aggregated silence inserted audio pieces file that substantially corresponds to the original audio file; and
      (iii) utilize the characteristics of the silence inserted audio pieces and the associated recognized text pieces to synchronize the display of the recognized text pieces from the original audio file and the playback of the associated audio pieces from the original audio file.

An audio processing method for providing synchronized display of recognized text from an original audio file containing speech spoken by a user and playback of the original audio file, said method comprising:
   (a) recognizing the spoken speech within the original audio file and generating recognized text pieces and associated audio pieces;
   (b) aggregating the audio pieces into an aggregated audio file;
   (c) applying silence detection to convert the original audio file and the aggregated audio file into a silence detected original audio file and a silence detected aggregated audio file, wherein silent and non-silent groups are identified using a threshold volume;
   (d) comparing the silence detected original audio file with the silence detected aggregated audio file and determining the differences in position of corresponding non-silence groups within the silence detected original audio file and the silence detected aggregated audio file;
   (e) inserting silence within the audio pieces according to the differences in position of corresponding non-silence groups within the silence detected original audio file and the silence detected aggregated audio file to create silence inserted audio pieces, such that aggregation of the silence inserted audio pieces results in an aggregated silence inserted audio pieces file that substantially corresponds to the original audio file; and
   (f) utilizing the characteristics of the silence inserted audio pieces and the associated recognized text pieces to synchronize the display of recognized text from an original audio file and playback of original audio file.

Further aspects and advantages of the invention will appear from the following description taken together with the accompanying drawings.

BRIEF DESCRIPTION OF THE DRAWINGS

In the accompanying drawings:

FIG. 7A is a graph illustrating an example of silence detected original audio file and a corresponding silence detected aggregated audio file;

FIG. 7B is a graph illustrating an example original audio file and a corresponding aggregated audio file;

DETAILED DESCRIPTION OF THE INVENTION

Figure 1:
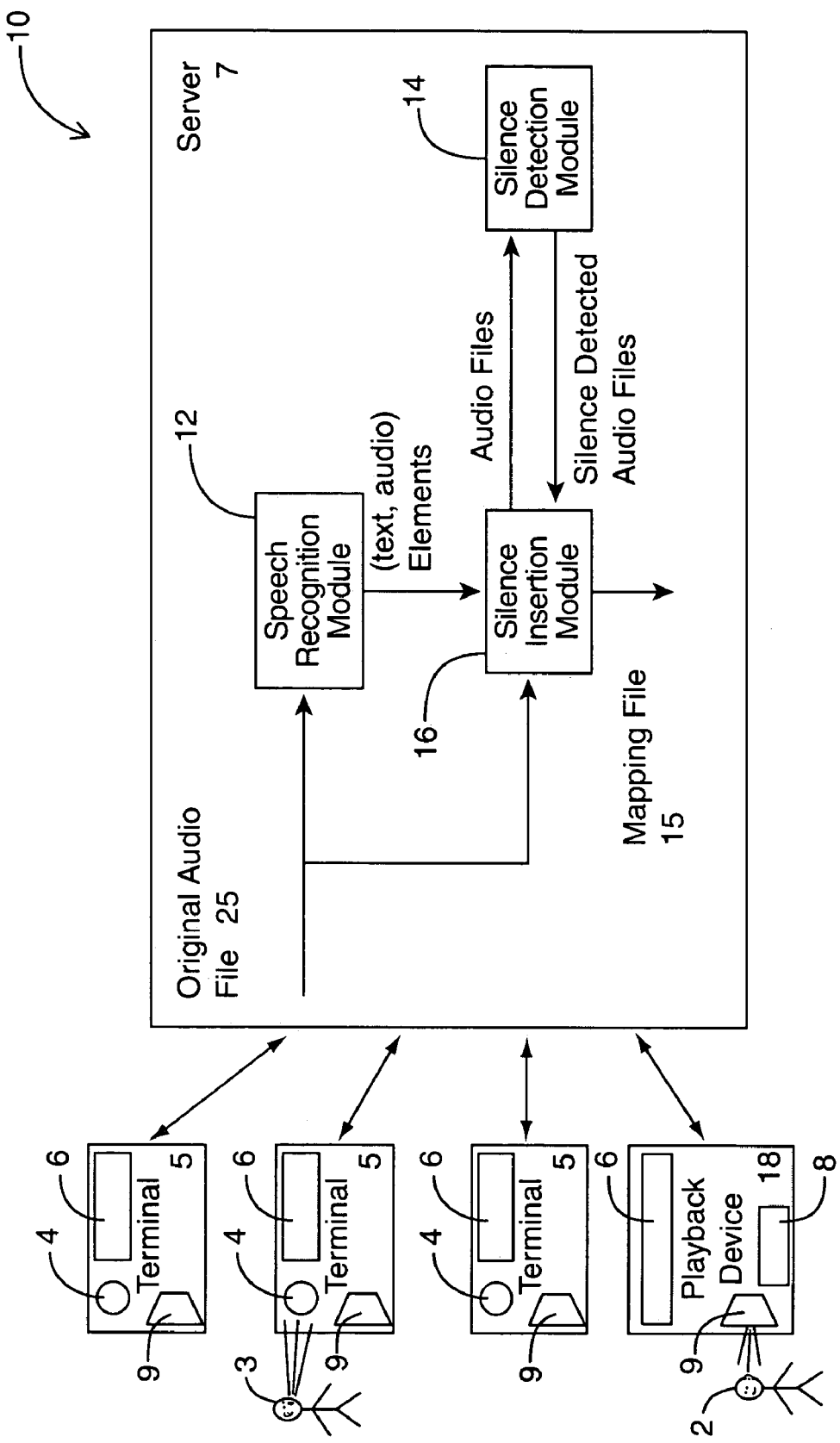
FIG. 1 is block diagram of the audio processing system of the present invention.
Figure 2:
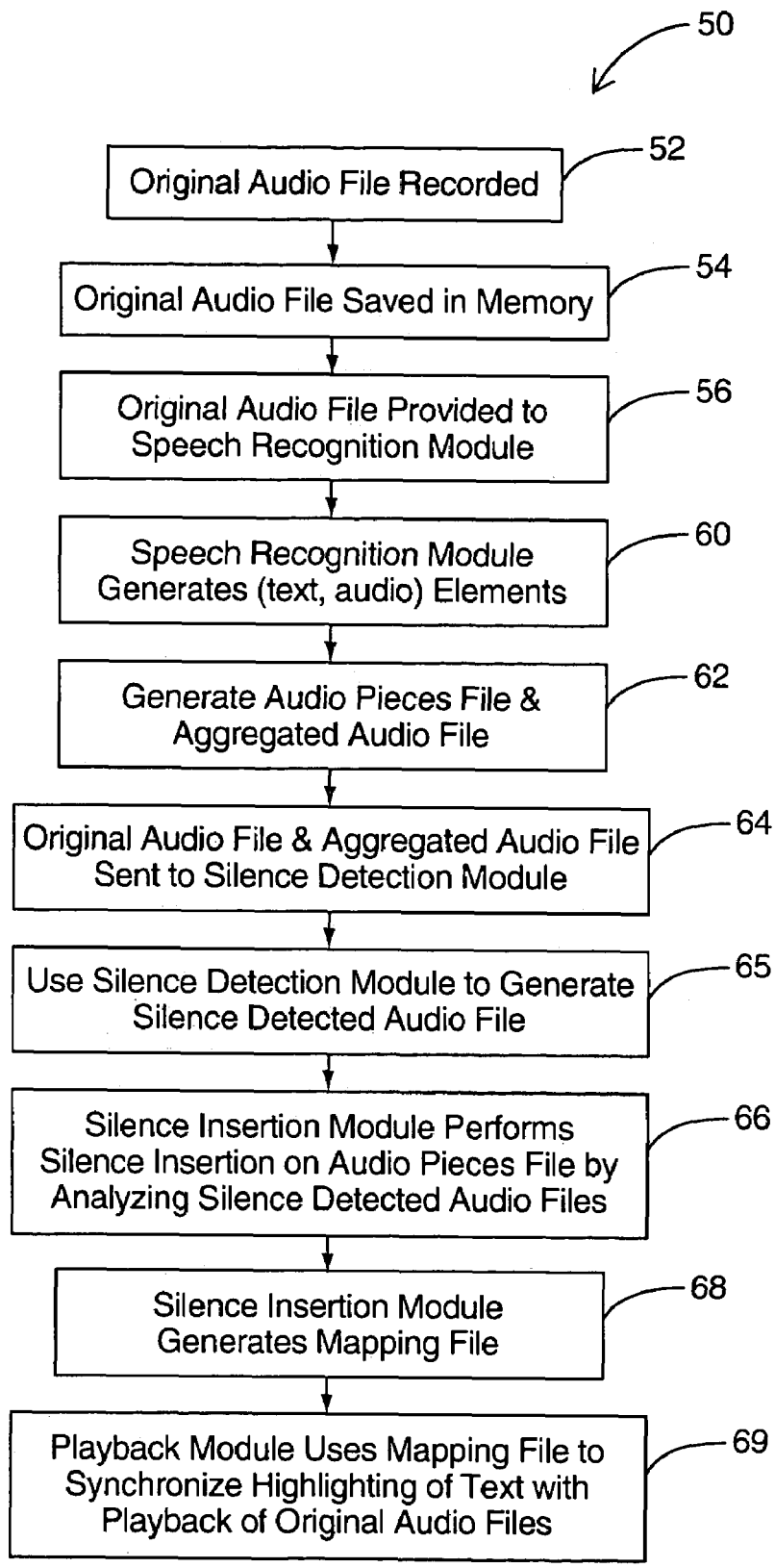
FIG. 2 is a flowchart illustrating the basic operational steps of the audio processing system of FIG. 1.

Reference is first made to FIGS. 1 and 2 which together illustrate the basic elements and processing stages of audio processing system 10 made in accordance with a preferred embodiment of the present invention. Audio processing system 10 includes a speech recognition module 12, silence detection module 14, silence insertion module 16 and a playback device 18. As shown, a user 3 speaks into a microphone 4 associated with a terminal 5 and this speech is recorded as an original audio file 25. The resulting original audio file 25 is analyzed by speech recognition module 12 to generate (text, audio) elements. Silence insertion module 16 and silence detection module 14 are used to display recognized words in synchronization With the audio playback of the original audio file 25 on playback device 18, as will be described.

Terminal 5 includes a microphone 4, a display 6 and a speaker 9 which together allow a user 3 to record speech and then to view a coordinated display of highlighted text during the playback of an original audio file 25. It should be understood that terminal 5 can be any wired or wireless speech input device (e.g. a personal computer or wireless dictaphone device, wireless telephone with display etc.)

Playback device 18 includes display 6, keyboard 8, speaker 9 and is preferably a conventional desktop personal computer for use by a transcriptionist 2. Preferably, playback device 18, is physically separate from the server 7 of audio processing system 10, and distinct from terminal 5 but it should be understood that playback device 18 could also be implemented within server 7 or terminal 5. It should be understood that it is contemplated that playback device 18 can be any wired or wireless speech input device (e.g. a personal computer or wireless dictaphone device, wireless telephone with display etc.)

Speech recognition module 12 receives original audio file 25 and performs conventionally known speech-to-text conversion operations on original audio file 25. Speech recognition module 12 is configured to generate output data in a particular format that is suited to further processing by audio processing system 10, namely a plurality of "(text, audio)" elements, where one (text, audio) element is obtained for every recognized word. Speech recognition module 12 is preferably implemented using a SAPI 4 compliant voice recognition engine, namely Dragon Naturally Speaking™ (manufactured by ScanSoft of Massachusetts, U.S.A.). However, it should be understood that any conventional speech recognition software that provides (text, audio) elements could be utilized by audio processing system 10 (e.g. ViaVoice manufactured by IBM of White Plains, N.Y., U.S.A. and Speech SDK 3.1™ product manufactured by Philips Speed Processing (PSP) of Austria.)

Silence detection module 14 determines the periods of silence (i.e. no speech) and non-silence (i.e. speech) within a particular audio file. Specifically, silence detection module 14 applies a volume threshold, averaging techniques as well as an adaptive sliding window algorithm to determine periods of silence and non-silence within an audio file. The result is a simplified representation of the audio file that indicates the periods of silence and non-silence and ascribes amplitude values to the non-silence segments. Silence detection module receives audio files from silence insertion module 16 and returns silence detected audio files.

Silence insertion module 16 generates all the required information needed to create a mapping file 15 that is used during playback of the original speech recording and display of the associated text. Silence insertion module 16 receives original audio file 25 from terminal 5, the associated recognized (text, audio) elements from speech recognition module 12 and forwards original audio file 25 and an aggregated version of the audio pieces from the (text, audio) elements to silence detection module 14 for processing as discussed above. Using the silence detected audio files generated by silence detection module 14, silence insertion module 16 is able to perform comparison operations to determine where silences should be inserted within the individual audio pieces recognized by speech recognition module 12. Once the appropriate silences have been inserted into the individual audio pieces, silence insertion module 16 generates mapping file 15. Mapping file 15 is stored with the original audio 25 for later use in playback device 18. Mapping file 15 provides the information required to highlight the current word(s) that corresponds with the audio version of the word being played for user 3 on terminal 5.

Playback device 18 then sends a request to server 7 for the original audio file 15 and mapping file 15 which is then received. The information stored within mapping file 25 is read by playback device 18 to play audio through speaker 4 synchronously with the display of appropriately highlighted text on display 6. A transcriptionist 2 edits recognized text directly on keyboard 8 associated with playback device 18. While it is contemplated that transcriptionist 2 (e.g. a staff person hired to proofread dictation) is a different person than user 3 (e.g. a doctor), they could be the same person. Once transcriptionist 2 proofreads the recognized text while listening to the played back audio, playback device 18 will provide terminal 5 with the corrected mapping file 15. At this point, user 3 will only need to correct the displayed text as it differs from the playback audio. It should be noted that on playback if transcriptionist 2 removes a word within the text, the audio portion that corresponds to the word is replaced by silence such that overall synchronization of text and audio is maintained.

Audio processing system 10 has been designed to be compatible with RTF (Rich Text Format), a standard recognized by MS Word™ (manufactured by Microsoft of Seattle, Wash.) and other high quality text editors. This allows for extensive formatting such as bold, underlined, italics, as well as tables, and other alignment functionality. Audio processing system 10 utilizes a high quality SAPI recognition engine to provide access to many more words including vocabularies for specialized professions such as medical and legal.

Figure 3:
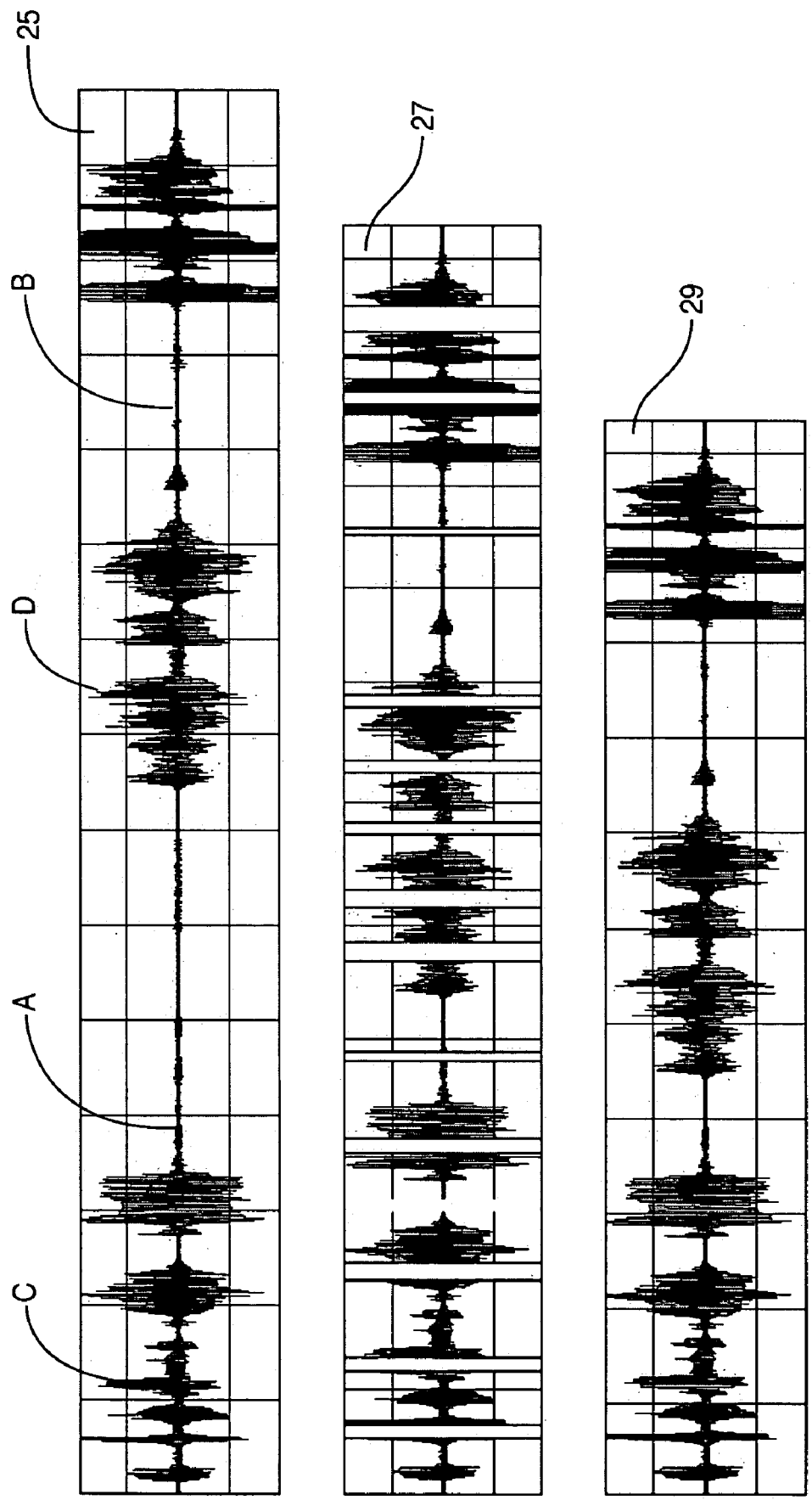
FIG. 3 is a series of graphs illustrating signal characteristics of the original audio file, the audio pieces file and the aggregated audio file.

Referring now to FIGS. 1, 2, and 3, the basic operation of audio processing system 10 is illustrated. Specifically, FIG. 2 illustrates the basic operational steps of the audio processing system 10 and FIG. 3 illustrates the different audio files that are utilized within audio processing system 10 including a graphical representation of the amplitude characteristics of a portion of an original audio file 25. As shown, the thin areas of the graph (e.g. at A and B) represent silence, while the peaks (e.g. at C and D) represent non-silence within original audio file 25.

At step (52) user 3 speaks into microphone 4 associated with terminal 5 to record original audio file 25 (FIG. 3) at terminal 5. Preferably original audio file 25 is recorded in .WAV file format, although it should be understood that many other audio formats could be used. At step (54), original audio file 25 is saved into memory. At step (56), original audio file 25 is provided to speech recognition module 12 for processing. At step (60), speech recognition module 12 processes the original audio file 25 and derives a textual representation of the input audio stream, namely a plurality of (text, audio) elements for each recognized word, using conventionally known techniques.

At step (62), the audio pieces from the (text, audio) elements generated by speech recognition module 12 are assembled individually within an audio pieces file 27 (FIG. 3) and compiled one after another into an aggregated audio file 29 (FIG. 3). At step (64), original audio file 25 and aggregated audio file 29 are sent to silence detection module 14 for processing and the silence detected original audio file 35 (FIG. 7A) and the silence detected aggregated audio file 39 (FIG. 7A) are returned to the silence insertion module 16. At step (65), silence detection module 14 is used to process the original audio file 25 and aggregated audio file 29 and to generate silence detected audio files. Specifically silence detection module 14 generates silence detected original audio file 35 and silence detected aggregated audio file 39. At step (66), silence insertion module 16 analyzes the silence detected original audio file 35 and the silence detected aggregated audio file 39 and uses the audio pieces file 27 to help determine the differences in position of the non-silence elements within the respective files. Based on these differences, silence insertion module 16 performs silence insertion within each audio piece within audio pieces file 27 (FIG. 3) to produce individually adjusted audio pieces. At step (68), silence insertion module 16 generates mapping file 15 based on the characteristics of silence inserted audio pieces.

At step (69), playback device 18 uses mapping file 15 to synchronize playback of original audio file 25 with the display of associated recognized text on display 6 on playback device 18. That is, recognized text is displayed on display 6 and specific words highlighted within the displayed text while original audio file 25 are played back. This allows transcriptionist 2 to proofread what has been recognized from the original speech dictation at terminal 5 in a coordinated fashion. Mapping file 15 contains the information required to selectively highlight segments of recognized text as the corresponding audio segment of original audio file 25 are played back. This improves the efficiency of the proofreading process and allows transcriptionist 2 to verify the accuracy of the recognized text (i.e. as recognized by speech recognition module 12) and provide an opportunity to make the appropriate corrections.

Figure 4A:
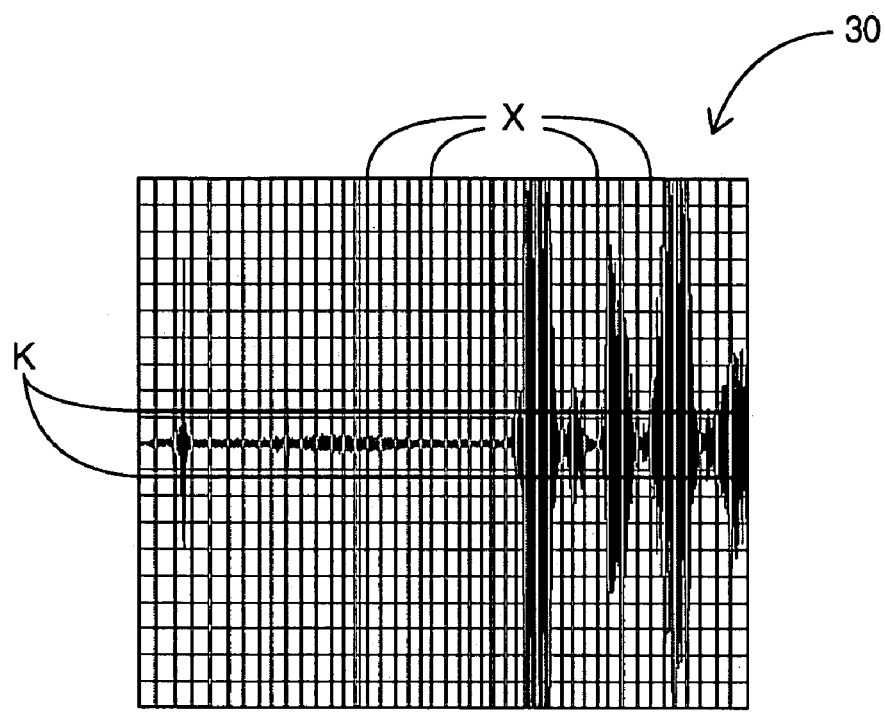
FIG. 4A is a graph illustrating an audio segment of the original audio file of FIG. 3.
Figure 4B:
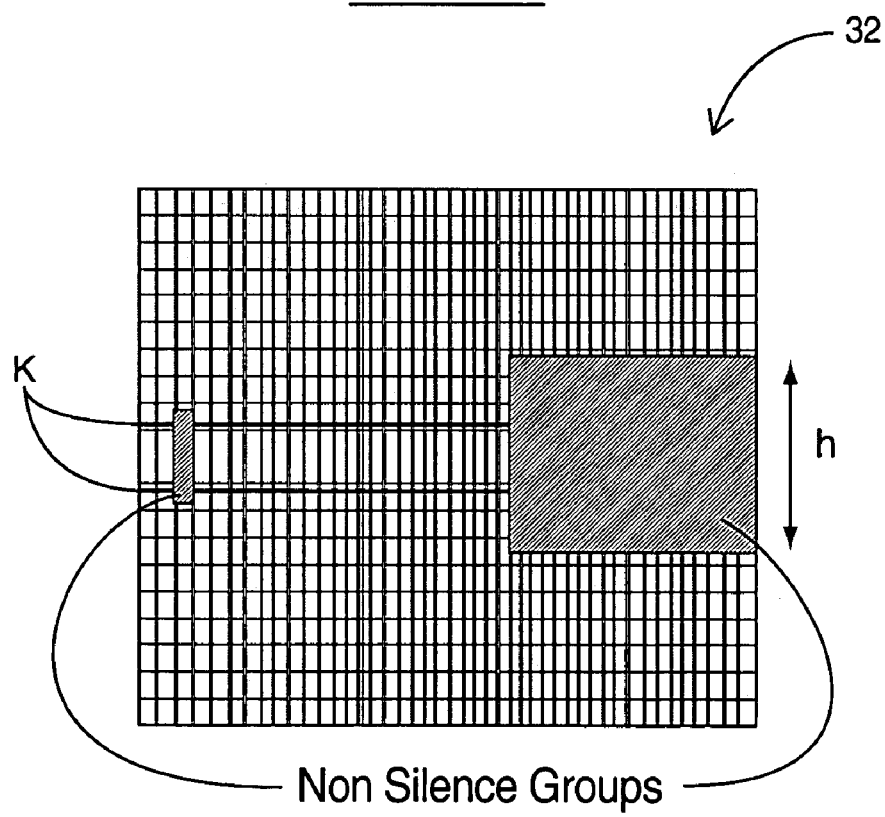
FIG. 4B is a graph illustrating the segment of a silence detected original audio file that results when silence detection module processes the audio segment of FIG. 4A.
Figure 5:
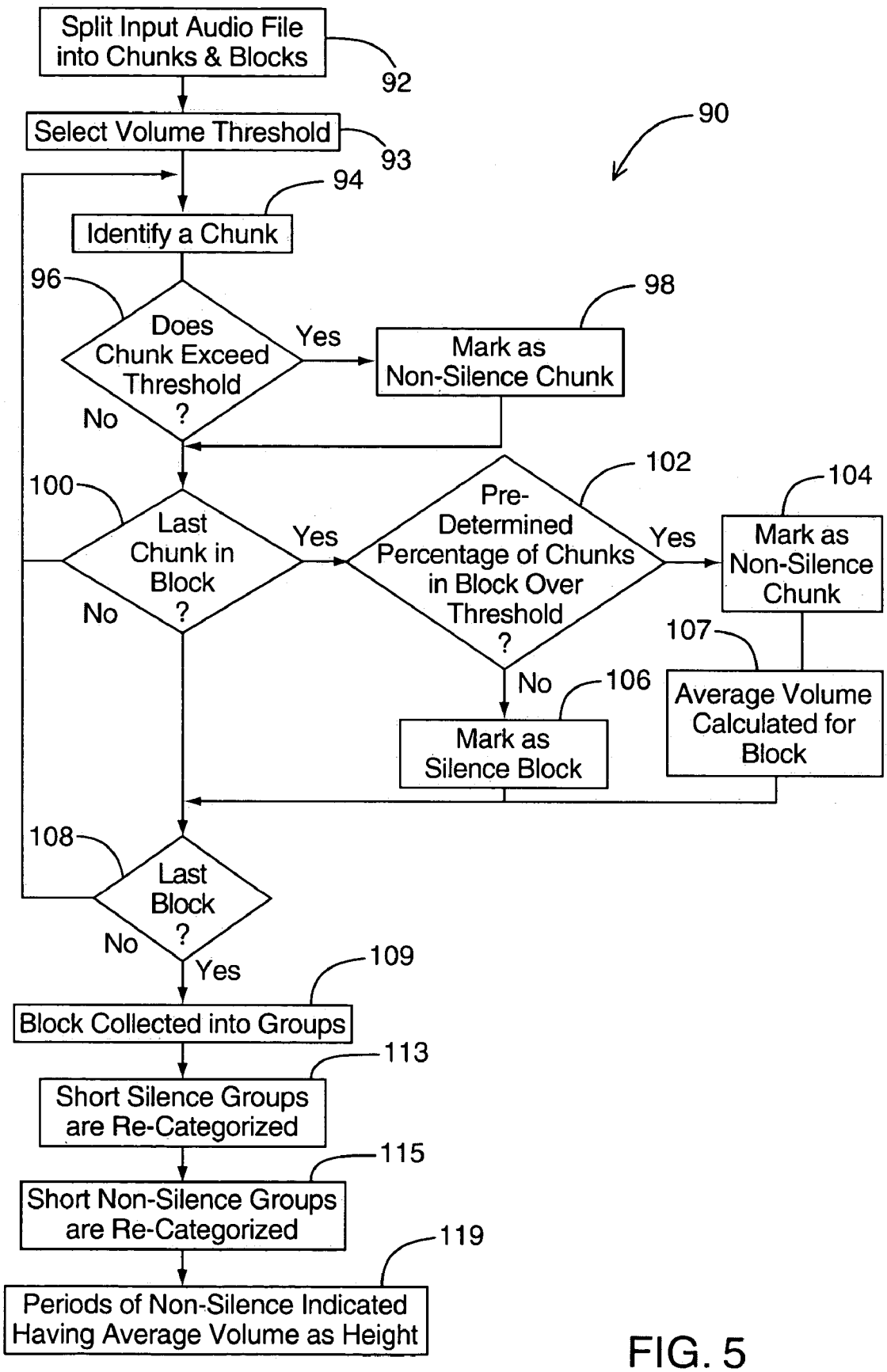
FIG. 5 is a flowchart illustrating the process steps conducted by the silence detection module of FIG. 1.
Figure 6A:
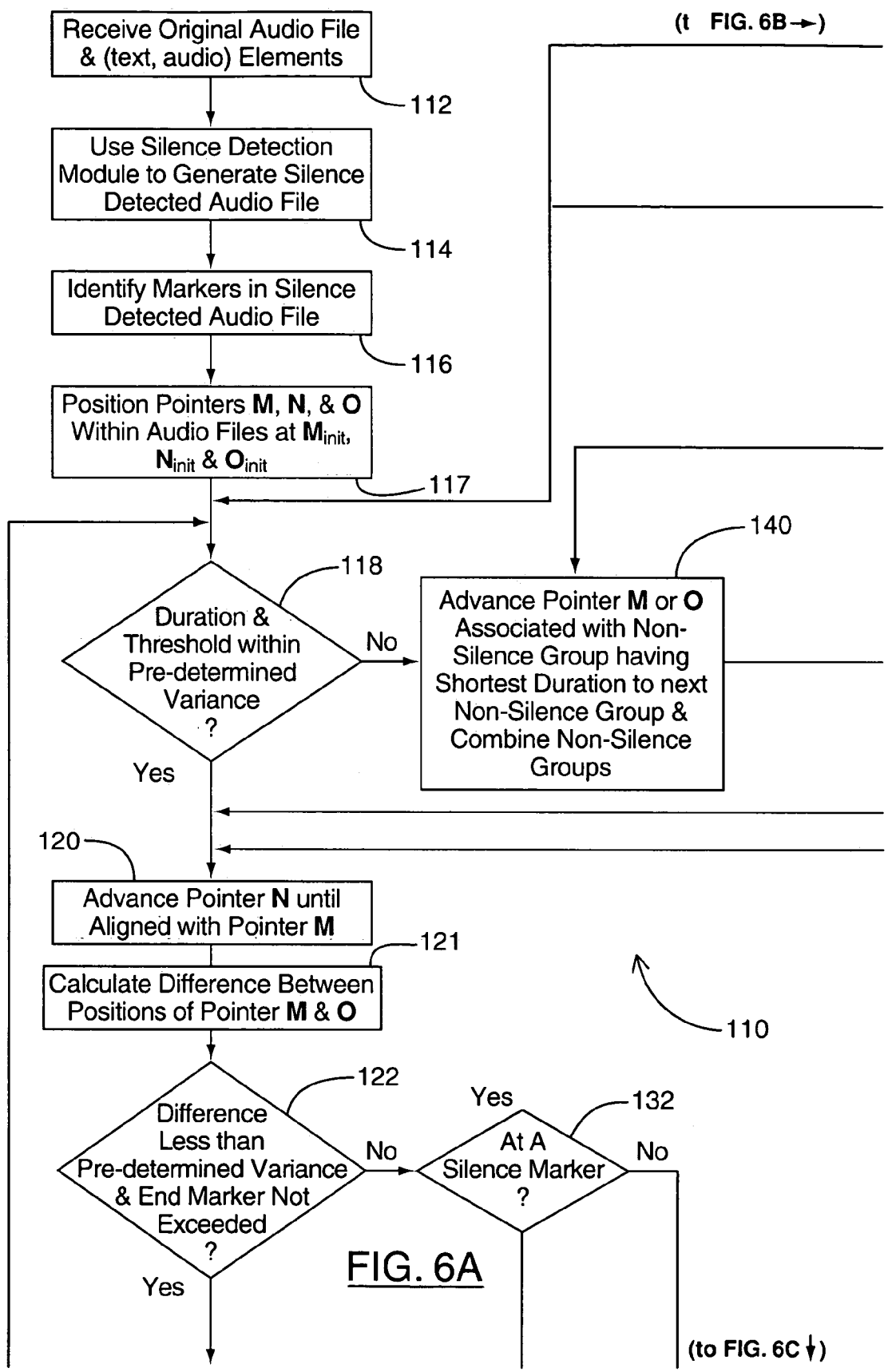
FIGS. 6A, 6B and 6C are flowcharts illustrating the process steps conducted by the silence insertion module of FIG. 1.
Figure 6B:
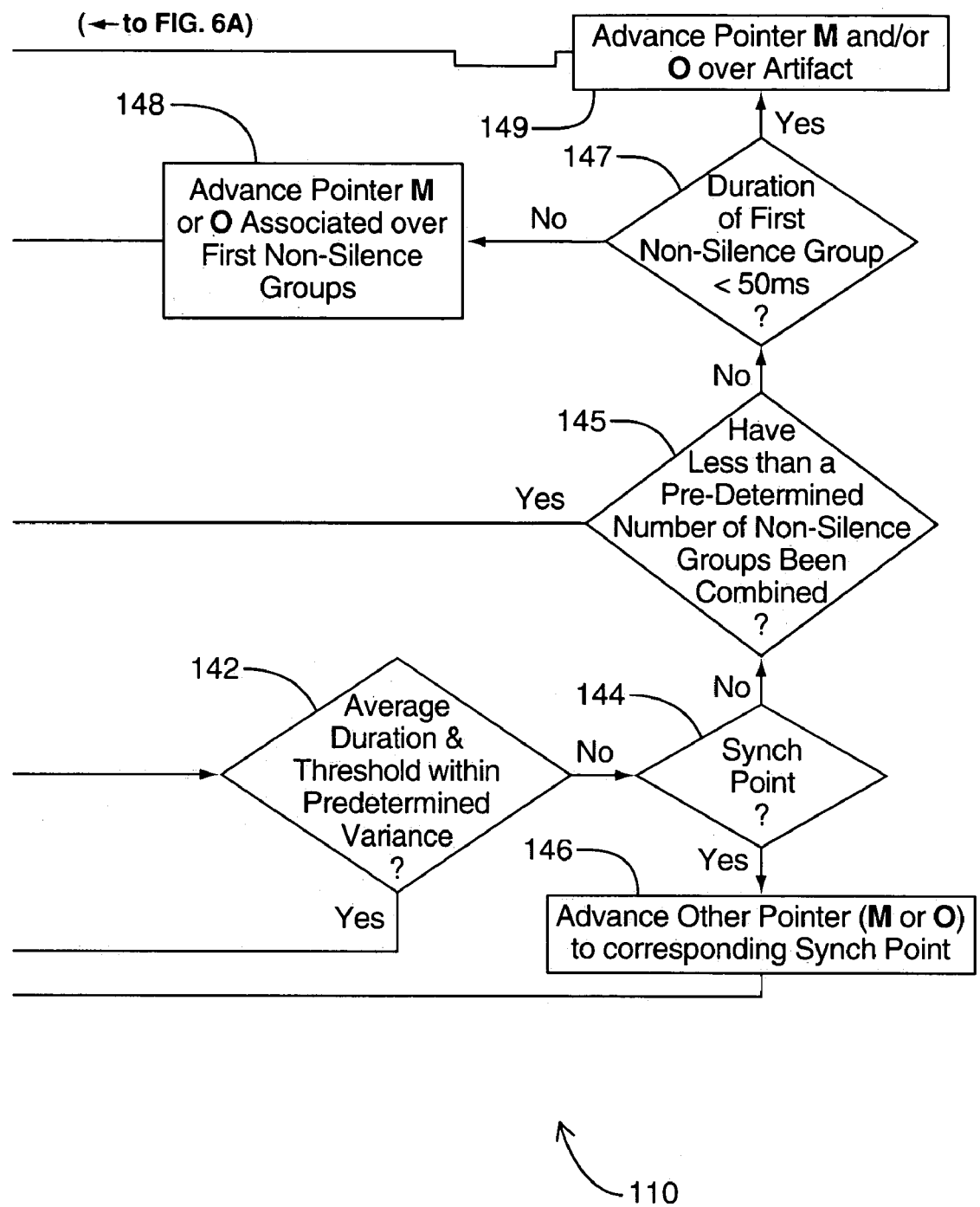
Figure 6C:
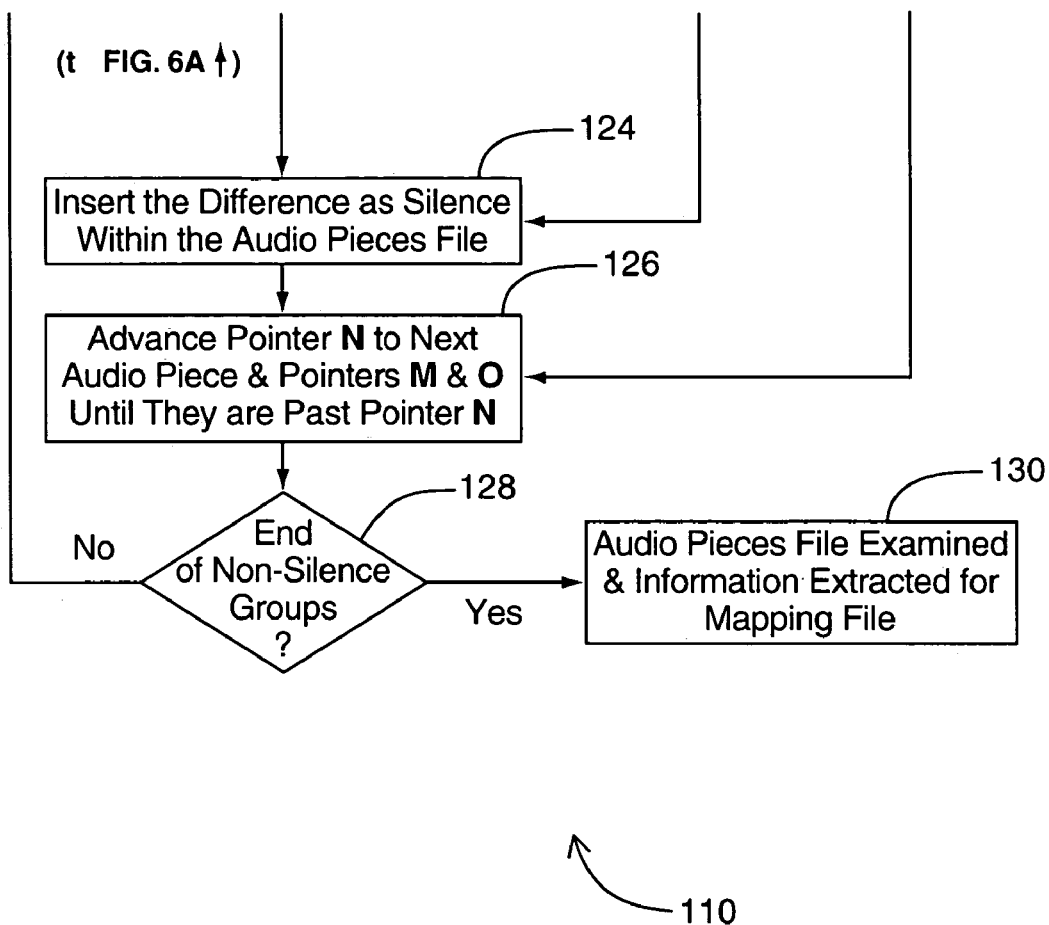

Referring now to FIGS. 1, 3, 4A, 4B, and 5, the operation of silence detection module 14 will be described in respect of original audio file 25. The processing steps 50 of silence detection module 14 are illustrated in FIG. 5. FIGS. 4A and 4B illustrate a segment of original audio file 25 (FIG. 4A) that is provided to silence detection module 14 and a segment 32 of the output of silence detection module 14 (FIG. 4B) as will further described. However, it should be understood that silence detection module 14 is adapted to operate on any type of audio file.

Specifically referring to FIGS. 4A and 5, at step (92), silence detection module 14 takes original audio file 25 and segments original audio file 25 into what are termed smaller sized "audio chunks" and larger sized "audio blocks" which contain "audio chunks". As shown in FIG. 4A, a segment 30 of original audio file 25 is shown. The white vertical lines designated as "X" in FIG. 4A represent audio block boundaries. Using properly dimensioned audio chunks and audio blocks, audio processing system 10 creates a simpler representation of the original audio file 25, while still leaving enough detail to make reasonable decisions for silence insertion module 16 as will be described.

Audio block size is selected based upon the desired accuracy of the silence detection process since audio block size dictates the bias of the algorithm. That is, larger audio blocks result in larger sections of audio being identified as being silent or non-silent. Correspondingly, smaller audio blocks result in smaller sections of audio being identified as being silent or non-silent. If smaller sized audio blocks are used, more information is provided regarding silence and non-silence boundaries. Very large audio blocks are undesirable because not enough silence/non-silence boundary detail is provided. Also, very small blocks are undesirable because too much silence/non-silence boundary detail is provided.

Accordingly, it is preferable for each audio block to contain the same number of audio chunks and for each of the audio chunks to be of the same duration (e.g. 6 ms) so that each audio block is also of the same duration. This is important because if the audio block sizes are not the same size, inconsistent amounts of silence/non-silence boundary detail over the duration of the input audio file 25 will result. It is import to maintain a consistent level of detail so that the performance of audio processing system 10 can be analyzed, and appropriate accuracy (i.e. detail) levels adjusted as needed. Without this kind of consistency, it is difficult to understand the behaviour of the audio processing system 10 and to have a high confidence in the quality of mapping file 15.

At step (93), a threshold volume is selected for audio processing system 10 either by user 3 through appropriate interactive menu options or automatically through some type of environmental noise calibration conducted at terminal 5 using microphone 4 and internal processing resources. It should be understood that the selected volume threshold should reflect the environment that user 3 is working in (e.g. different settings will be appropriate for emergency rooms vs. quiet family doctor office). The volume threshold volume is selected such that voice samples that lie above the volume threshold are likely to constitute speech. The horizontal lines marked at "K" in FIGS. 4A and 4B indicate a selected volume threshold for the purposes of this illustration.

Silence detection module 14 selects the volume threshold such that a preset number of silence and non-silence audio blocks are found within a pre-determined time period of audio (e.g. one minute). If the volume threshold is too high then all audio data will be detected to be silence, and similarly, if the volume threshold is too low then all audio data will be detected to be non-silence. Silence detection module 14 adjusts the volume threshold higher or lower based on whether more or less silence and non-silence groups are required for proper operation. For example, if it is desired to detect 100 silence groups per minute and during audio processing it is determined that less than the required 100 silence groups are being detected, then the volume threshold will be lowered so that the number of silence blocks found are increased. This process is repeated until the desired 100 silence groups are found. The inventors have determined based on several tests that it is preferred to be able to detect 100 silence groups per minute. This value appears to provide optimal results based on a number of audio sample cases.

At step (94), an audio chunk is identified for the purposes of evaluating whether the audio chunk exceeds the volume threshold. At step (96), the audio chunk is evaluated to determine if it "exceeds" the volume threshold. While it has been determined that reasonable performance has been achieved by examining every fifth sample in an audio chunk and averaging the value of the samples, it should be understood that many other evaluation approaches could be used. If the average value of the samples is over the threshold selected, then the audio chunk is deemed to exceed the threshold, and is identified as a non-silence chunk at step (98). However, it should be understood that many other ways of determining whether an audio chunk exceeds the volume threshold could be applied. The inventors have determined that a reasonable sampling rate for audio files for audio processing system 10 is 11,025 Hz. Therefore, using the above-noted 6 ms chunk size, the number of samples found in a 6 ms chunk of audio is 11025/1000*6 ms=66.15 (or 66) samples.

At step (100), it is determined whether the previously examined audio chunk is the last chunk in an audio block. If not, then the next audio chunk is identified at step (94). If so, then the entire audio block is evaluated to determine whether the audio block exceeds the threshold level. Specifically, at step (102) it is determined whether more than a pre-determined proportion (e.g. 70%) of the audio chunks in the audio block are over the volume threshold. It should be understood that other proportions could be used, although generally speaking, over 50% is needed for proper operation. If so, then at step (104), the audio block is deemed to exceed the volume threshold and identified to be a non-silence block. An average threshold is also calculated for each non-silence block at (107). If not, then at step (106), the audio block is identified to be a silence block.

Finally, at step (108), it is determined whether the audio block that has been processed is the last audio block. If not, then threshold determination continues at step (94). If so, then at step (109), the audio blocks are collected into groups as shown in FIG. 4B. Specifically, a contiguous set (i.e. blocks touching each other) of silence blocks forms what is termed a "silence group". Correspondingly, a contiguous set of non-silence blocks forms what is termed a "non-silence group". It should be understood that silence blocks and groups have zero volume as shown in FIG. 4B.

At step (113) short silence groups are re-categorized. Specifically, a silence group that is smaller than a predetermined duration (e.g. less than 30 ms in duration) is then re-categorized as being "non-silence" if it falls between two non-silence groups. Similarly, at step (115), a non-silence group that is smaller than a predetermined duration (i.e. less than 30 ms in duration) is re-categorized as being "silence" if it falls between two silence groups. These instances are often caused by a sharp cough, or background noise outside of regular speech. This categorization process is conducted using the "left to right" priority rule as described below.

Figure 4C:
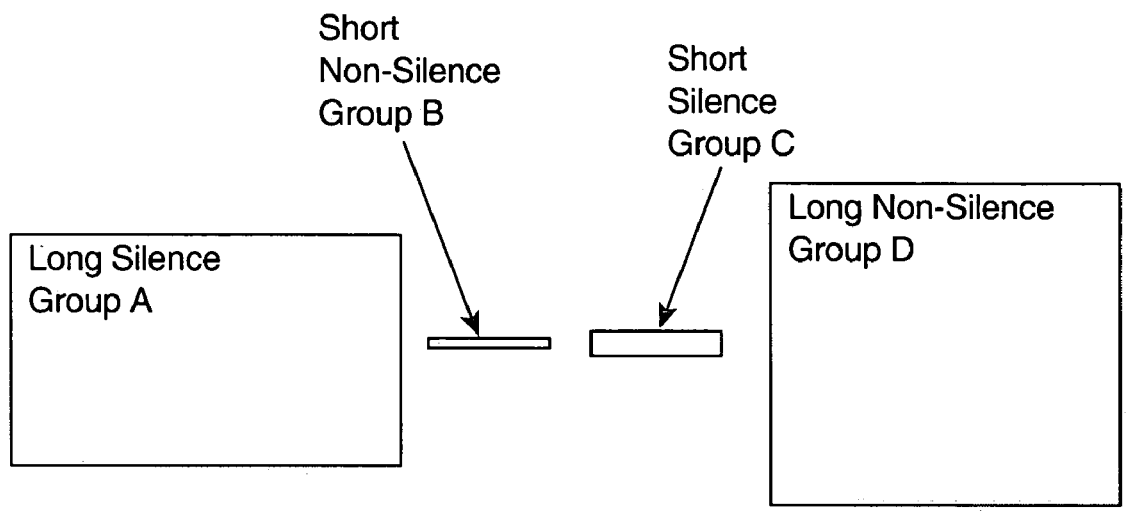
FIG. 4C is a representation of a example configuration of silence and non-silence groups that is processed by silence detection module of FIG. 1.

As illustrated in FIG. 4C, a long silence group A is followed by a short non-silence group B, followed by a short silence group C and a long non-silence group D. In this situation, processing from left to right, when the short non-silence group B is encountered, it will be considered silence, since it follows a longer silence block A. That is, the creation of a silence group that includes the long silence group A and the short non-silence group B will be preferred over the creation of a distinct non-silence group. When the short silence group C is encountered, the creation of a silence group that includes long silence group A and the short non-silence group B and short silence group C occurs. Finally, when the long non-silence group D is encountered, the creation of a distinct non-silence group is preferred. This kind of re-categorizing is intended to favour longer groups of silence and non-silence.

Silence detection module 14 conducts the processing steps 50 of FIG. 5 discussed above, as a single pass through an audio file, such as original audio file 25. Also as noted, the application of these process steps on the audio segment 30 of FIG. 4A results in the processed audio segment 32 of FIG. 4B. Specifically, as shown in FIG. 4B, at step (117), the re-categorized groups of non-silence are indicated where each re-categorized group has an average amplitude (i.e. volume) that is denoted by the height h (as shown in FIG. 4B) of the segment. The segments representing periods of non-silence are indicated on the graph of FIG. 4B as grey areas G, and as noted above, the height h of these areas depend on the average amplitude.

Referring back to step (109), silence detection module 14 determines whether a given non-silence group should be considered as non-silence using an adaptation process which is performed on a block-by-block basis. The adaptation process is essentially a sliding window algorithm where the window contains the average amplitudes of the last n non-silence groups. A new non-silence group is examined to see if its average amplitude is in keeping with the averages of the previous n groups. If it is, then the new group is added to the window and the earliest group in the window is removed. If the average amplitude of the new group is not in keeping with the averages of the previous n groups then the new group is discarded as if it were a silence group. An example group amplitude listing 34 is shown in FIG. 4D.

Figure 4D:
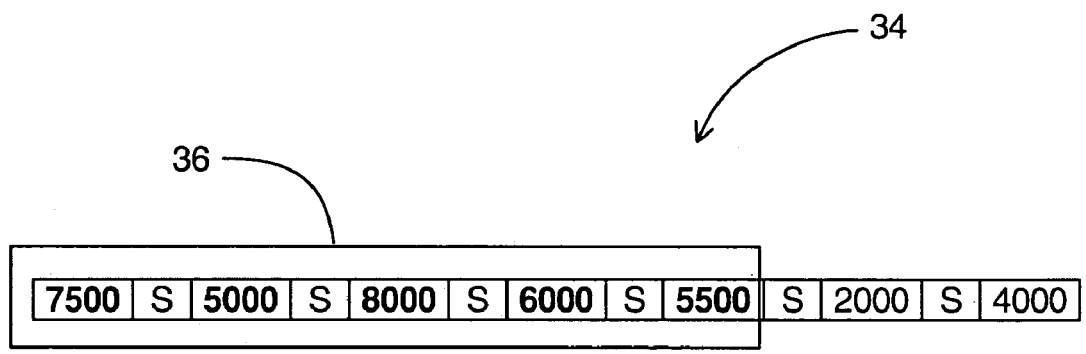
FIG. 4D is a representation of an example group amplitude listing used within the silence detection module of FIG. 1.

The group amplitude listing 34 of FIG. 4D holds average amplitude values for 13 contiguous groups of original audio file 25 that is being processed. It should be noted that the entries labeled as "S" are silence groups. The other entries are non-silence groups with the having the indicated average amplitudes. A sliding window register 36 (FIG. 4D) is used to process the amplitude values within group amplitude listing 34. For the purposes of this example, the beginning of sliding window register 36 is set to the first non-silence group (i.e. the group having amplitude 7500) and the window size for sliding window register 36 is set to 5 (i.e. so it contains 5 non-silent amplitude values). Thus, the amplitude values in bold form the current window. At this point, the $6^{th}$ non-silence group having an average amplitude of 2000 is about to be processed. The average of the values currently within the sliding window register 36 is 6400. It is determined whether the average amplitude of the current group is within a predetermined percentage (e.g. 60%) of the average of the values currently within the sliding window register 36. Since the average amplitude of the current group (i.e. the 6th group under consideration) is much less than 60%, that group will be re-categorized as silence and appended to its surrounding silence blocks. Then next non-silence group (i.e. the group having amplitude 4000) is processed using the same sliding window determination process just described.

This kind of adaptation is important for practical operation of audio processing system 10 for the reason that user 3 does not always speak at the same level throughout the entire dictation. For example, background noise may increase or decrease during the dictation and user 3 will raise and lower his/her voice accordingly, to compensate for changes in background noise. By using a sliding window register 36 as discussed above, these kinds of amplitude level changes can be accounted for. Accordingly, it should be understood that the original volume threshold provided to audio processing system 10 constitutes a low water mark since only non-silence groups over the established volume threshold level will be considered as potential non-silence candidates, but not all groups over the volume threshold will be selected as a non-silence segment by silence detection module 14.

Referring now to FIGS. 1, 3, 6A, 6B, and 6C, the operation of silence insertion module 16 will now be described. Silence insertion module 16 generates all the information that is required to create the mapping file 15 for audio processing system 10. As discussed above, mapping file 15 provides the application with a means for correlating the visual display of the dictation with the audio playback, such that proper highlighting of current word(s) is achieved. As shown in FIG. 1, silence detection module 16 receives the original audio file 25 from terminal 5 and obtains the (text, audio) elements from speech recognition module 12. Further, silence insertion module 16 generates an aggregated audio file 29 based on the individual audio pieces from the (text, audio) elements obtained from speech recognition module 12. Silence insertion module 16 utilizes silence detection module 14 to generate mapping file 15, as Will be described.

Referring specifically to FIGS. 3 and 6A, 6B, 6C, during the speech recognition stage, speech recognition module 12 generates recognition results objects. Each results object consists of a large set of information that includes the text piece that was recognized, the corresponding audio piece (i.e. the (text, audio) element referred to above) as well as a confidence level (e.g. a number from 1 to 100). The confidence level indicates how certain speech recognition module 12 is of the resulting textual interpretation of the audio piece. By aggregating the text pieces together, it is possible to obtain a recognized text stream. While it is also possible to simply aggregate the corresponding audio pieces 27 into an aggregated audio file 29, the aggregated audio file 29 does not exactly match the original audio file 25.

As shown in FIG. 3, the aggregated audio file 29 is always shorter in duration than the original audio file 25 because the silent pieces in the original audio file 25 are omitted. While the silence in the original audio file 25 is not important to the speech recognition module 12, the presence of these silent pieces is critical to the proper synchronization of the original audio file 25 with the recognized text stream during playback. Silence insertion module 16 acts to reclaim the missing silence pieces in the aggregated audio file 29 so that accurate timing information can be used to achieve synchronous playback of the recognized text stream and the original audio file 25.

Referring back now to FIGS. 1, 3, 6A, 6B, 6C, and 7A, specifically, FIGS. 6A, 6B and 6C illustrate the main operation steps 110 of silence insertion module 16. At step (112), silence insertion module 16 obtains original audio file 25 from terminal 5 and (text, audio) elements from speech recognition module 12. At step (114), silence insertion module 16 uses silence detection module 14 to reduce the complexity of the original audio file 25 and aggregated audio file 29. Original audio file 25 contains a substantial amount of information. For example, in an original audio file 25 that has 11,000 samples of audio per second, there are 660,000 individual pieces of information per minute that are available for processing by audio processing system 10, much more information that what is needed. To reduce the amount of information to a manageable size, silence detection module 14 is utilized to reduce original audio file 25 to a corresponding sequence of silence and non-silence periods, namely a silence detected original audio file 35 (FIG. 7A) and to reduce aggregated audio file 29 to a corresponding sequence of silence and non-silence periods, namely a silence detected aggregated audio file 39 (FIG. 7B).

By using the representations silence detected original audio file 35 and silence detected aggregated audio file 39 (i.e. sequences of silence and non-silence periods) that are generated by silence detection module 14 (as opposed to using the individual audio samples), it has been determined that a reduction in information of approximately 6000 times can be achieved. This upfront processing by silence detection module 14 simplifies the overall processing and reduces the computation time involved. Again, as shown in FIG. 7A, the heights h of the grey non-silence periods represent the average amplitude (volume) of the component audio blocks within each period as calculated by silence detection module 14.

Referring back to FIGS. 1, 3, 6A, 6B, 6C, 7A, and 7B, at step (116) various markers (denoted by a "▶$_1$", "▶$_2$", to "▶$_8$", as "□", as "◁" in the graphs of FIG. 7B) are identified in both original audio file 25 and aggregated audio file 29. These markers help to limit the silence that is inserted so as to prevent the insertion of too much silence. Some of the markers also serve as synchronization points. The markers are identified in pairs (i.e. one in the original audio file 25 and a corresponding one in the aggregated audio file 29). By lining up pairs of markers through the appropriate insertion of silence, a self-correcting procedure is created which will ensure that even during complex calculations for silence insertion, if a wrong decision is made, the resulting playback audio file will still be primarily aligned by the markers that serve as synchronization points. That is, errors will be contained between contiguous synchronization markers (i.e. "▶$_1$", "▶$_2$", to "▶$_8$") in a region between synchronization markers). Markers can be identified in both the original audio file 25 and the aggregated audio file 29 in a variety of ways.

First of all, synchronization points are determined within the audio signal of both original audio file 25 and aggregated audio file 29, by identifying the loudest points of the audio signal in each case. As noted above, the difference between the original audio file 25 and aggregated audio file 29 is that silence is missing from aggregated audio file 29. Accordingly, it is determined that the loudest pieces of original audio file 25 will be present in aggregated audio file 29. These synchronization points are identified as synchronization markers as shown in FIG. 7B.

Also, long periods of silence in original audio file 25 provide an indication of where large amounts of silence will need to be inserted into the aggregated audio file 29. Heuristically speaking, there can be a high degree of confidence that such silences will be omitted in aggregate audio file 29. Accordingly, when a long period of silence is identified in original audio file 25, it can be safely said that a significant piece of silence should be added to aggregated audio file 29. FIG. 7B shows two silence markers "◁" and an end marker "□", within original audio file 25. It should be noted that the two silence markers within original audio file 25 are not present in the aggregated audio file 29. This is because it is very unlikely that the long periods of silence within original audio file 25 will be present in the aggregated audio file 29.

Finally, the duration of original audio file 25 should be approximately the same as the duration of all silence-inserted audio pieces. That is, the final result of adding silence to aggregate audio file 29 should result in a file having a duration that is approximately as long as the length of the original audio file 25 and should never be longer in duration. Accordingly, an end marker positioned at the end of the original audio file 25, is used to mark the upper limit on the length of the aggregated audio file 29 after all silence insertion has taken place (see FIG. 7B). It is preferred for the original audio file 25 to have the same length as the aggregated audio file 29 after silence has been inserted. It should be noted that the use of a beginning marker is not necessary since it is understood that all audio files start at position "zero".

Referring now to FIGS. 1, 6A, 6B, 6C, and 8, silence insertion module 16 works with three audio files, namely silence detected original audio file 35, audio pieces file 27 obtained from speech recognition module 12 and silence detected aggregated audio file 39 obtained from silence detection module 14. Silence insertion module 16 also uses three pointers, M, N, and O (FIG. 8), one for each of the files noted above, respectively to indicate the current position within the audio. Silence detected original audio file 35 contains the various markers (e.g. synchronization marks, silence markers, end marker) associated with the original audio file 25.

At step (117), pointer M is initially located at $M_{init}$ where it points at the beginning of the first non-silence period within the silence detected original audio stream 35. At the beginning of each iteration pointers M, N and O are assumed to be unaligned (i.e. not necessarily pointing at the piece of audio where silence is to be inserted). Accordingly, the pointers need to be adjusted so that they are pointing to the same piece of audio. Since the silence detected original audio file 35 is longer than silence detected aggregated audio file 39, it can be safely assumed that pointer M will be further ahead in the associated audio stream than point O. Pointer $N_{init}$ is initially located at the beginning of audio pieces file 27. Pointer $O_{init}$ initially points at the first non-silence period within the silence detected aggregated audio file 39. Generally, it should be noted that silence detected aggregated audio file 39 is only used as a tool to help measure differences between the time positions of measured audio pieces and silence detected original audio file 35. After silence insertion module 16 has finished comparing non-silence groups, silence detected aggregated audio file 39 is discarded.

Figure 8:
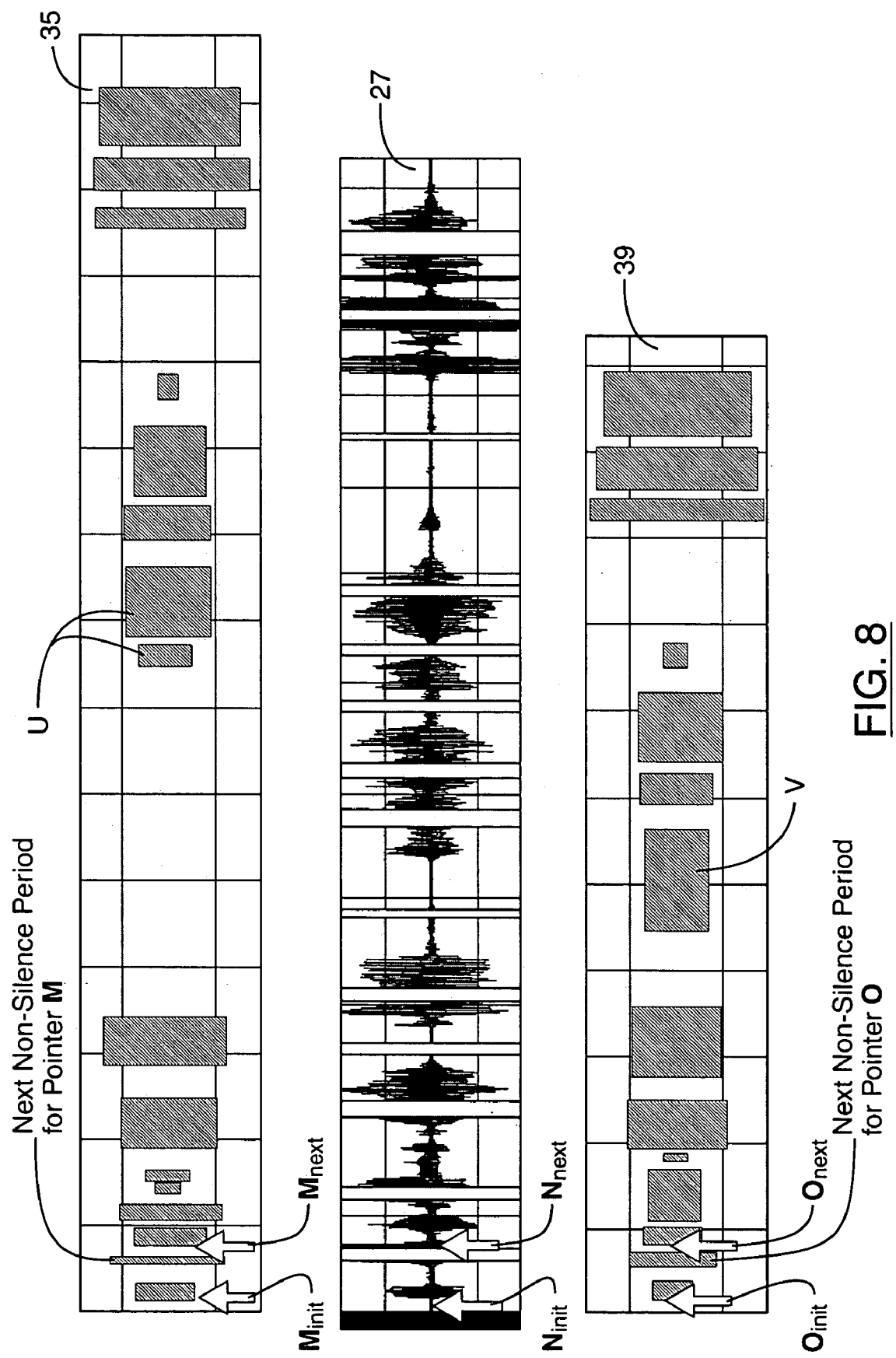
FIG. 8 is a series of graphs illustrating an example silence detected original audio file, a corresponding audio pieces file, and an a corresponding silence detected aggregated audio file.

At steps (118) to (128), silence insertion module 16 determines whether there is a match between two particular non-silence groups within silence detected original audio file 35 and silence detected aggregated audio file 39. That is, insertion module 16 attempts to position pointers M and O on matching non-silence groups. For example, the position of pointers M and O in silence detected original audio file 35 and silence detected aggregated audio file 39, respectively, as shown in FIG. 8 refer to non-silence groups. Whether or not pointers M and O are in fact pointing to the same non-silence group can be determined through the comparative analysis of the respective duration and thresholds of one or more non-silence groups associated with pointers M and O as well as by detection of silence markers and synchronization points.

At the start of each iteration, the pointers M, N and O are adjusted so that they are pointing at the same piece of audio. Once it is decided that two groups match, then their positions are determined within the respective audio files 35 and 39 and the difference in their position is used to compensate the individual audio pieces (i.e. by adding the difference as a silence period before the audio piece). Accordingly, during each iteration of the silence insertion module 16, the amount of silence that needs to be inserted within an audio piece is determined and inserted into the audio pieces audio file 27. It should be noted that pointer N is never adjusted backwards and that pointers M and O advance independently and are used to move forward to gain context and to determine whether there is a fit between one or more non-silence groups in their respective audio files 35 and 39.

At step (118), pointers M and O are examined to see if the associated durations and relative thresholds of the non-silence groups they are pointing at are within a pre-determined variance (e.g. 80%) of each other. For a particular audio piece that pointer N is pointing to, it is determined whether a period of silence will be inserted in front of this audio piece and if so, the duration of the period of silence. This approach (i.e. associating silence with individual words) has been determined by the inventors to be more effective than adding silence to aggregate audio file 29.

If at step (118), pointers M and O are determined to be pointing at non-silence groups that have durations and thresholds that are within a pre-determined variance (i.e. within 80%) of each other, then at step (120), pointer N is advanced an audio piece at a time until pointer N is aligned with pointer M. At step (121), silence insertion module 16 calculates the difference in position between pointers M and O within their respective silence detected audio files 35 and 39, respectively. At step (122), silence insertion module 16 determines whether the difference is less than a pre-determined length of time (e.g. 300 ms). At step (122), it is also confirmed that if silence insertion is performed using silence having a duration equal to this difference, it will not result in an audio file that is longer than the length of original audio file 25. If both of these are true, then at step (124), a silence period having duration equal to the time difference calculated is inserted ahead of the audio piece identified by pointer N within audio pieces file 27. At step (126), pointer N is advanced to the next audio piece and pointers M and O are advanced until they are past pointer N. Since it is not the end of the non-silence blocks, at step (128), another iteration is begun starting with step (118).

If at step (122), either the difference in position of pointers M and O is not within a pre-determined variance (e.g. less than 300 ms) or the addition of a silence period having a duration equal to this difference results in the total length of the audio pieces file exceeding the end marker, then step (132) is executed. At step (132), it is determined whether pointer M or O is positioned at a silence marker. If at step (132), it is determined that pointer M or O is at a silence marker then at step (124), a silence period having duration equal to the time difference calculated at step (121) is inserted ahead of the audio piece identified by pointer N within audio pieces file 27. At step (126), pointer N is advanced to the next audio piece and pointers M and O are advanced until they are past pointer N. Since it is not the end of the non-silence blocks, at step (128), another iteration is begun starting with step (118).

If at step (132), neither pointer M or O is determined to be at a silence marker, then is it not correct to insert this amount of silence within the audio piece currently pointed to by pointer N. Accordingly, no silence is inserted to the audio piece at issue and at step (126) pointer N is advanced to the next audio piece and pointers M and O until they are past pointer N.

At step (118), if pointers M and O are determined to be pointing at non-silence groups that have duration and thresholds that are not within a pre-determined variance (i.e. not within 80%), then at step (140), the pointer M or O which points at the shorter non-silence group is advanced to the next non-silence group and the next and previous non-silence groups are combined and their characteristics compared to those of the non-silence group pointed to by the other pointer M or O. However, if the non-silence groups pointed at by pointers M and O are the same duration then both pointers M and O are advanced and the durations and thresholds for the two non-silence audio groups associated with pointer M are individually averaged and the same for those associated with pointer O. At step (142), it is again determined whether pointers M and O have similar durations and thresholds using synchronization markers. As more and more audio blocks are incorporated into the averaging calculations, it is important to make ensure that a synchronization marker is not passed.

For example, as shown in FIG. 8, the non-silence group marked as "V" in silence detected aggregated audio file 39 is in fact the same piece of audio as represented by the two smaller non-silence groups marked as "U" in silence detected original audio file 35. At step (140), the pointer that is pointing at the non-silence group having shorter duration (in this case pointer M) is advanced to the next non-silence group. Both non-silence blocks marked as "U" are combined and their thresholds and amplitudes averaged. At step (142), the averaged thresholds and amplitudes of the non-silence blocks marked as "U" are compared to the threshold and amplitude of the non-silence group marked as "V", and in this case are found to be within a pre-determined variance (i.e. within 80%).

As a further illustration of this part of the silence insertion process, consider pointers M, N and O that are first positioned at $M_{init}$, $N_{init}$ and $O_{init}$ as shown in FIG. 8. Specifically, pointers M, N, and O are positioned at the following offsets:

$M_{init}$ at 100 ms; non-silence duration=100 ms; threshold=6,000

$N_{init}$ at 0 ms; non-silence duration=100 ms $O_{init}$ at 50 ms; non-silence duration=100 ms; threshold=7,000

According to the silence insertion procedure of the invention, at step (118), it is determined whether the duration and thresholds of the non-silence groups pointed to by pointers M and O are within a pre-determined percentage range of each other (e.g. 80%). Since in this case they are not, step (140) is executed. It should be noted that the durations of the non-silence groups that are pointed at by pointers M and O are equal (i.e. both 100 ms) and accordingly, both pointers M and O are advanced to the next non-silence group and an average duration and threshold for each pair of previous and next non-silence group is calculated for each pointer M and O. It should be understood that in the case where durations of the non-silence groups that are pointed at by pointers M and O are not equal, then only the pointer M or O associated with the non-silence group having the shorter duration would be advanced.

For the purposes of the example, it should be assumed that the next non-silence periods for pointers M and O have the following characteristics (as illustrated in FIG. 8 as "next non-silence period for M and O, respectively):

Next Non-Silence period for pointer M:

100 ms of silence; non-silence duration=50 ms; threshold=10,000

Next Non-Silence period for pointer O:

80 ms of silence; non-silence duration=70 ms; threshold=10,000

At step (142), the averaged results are then calculated as follows:

M pointer positioned at 100 ms; duration=250 ms; threshold=6000*100/250+0+9500*70/250=5060

O pointer positioned at 50 ms; duration=250 ms; threshold=7000*100/250+0+10,000*70/250=4800

Accordingly, at step (142), it is determined whether the average durations and thresholds of the non-silence groups pointed to by pointers M and O are now within a pre-determined percentage variance (e.g. 80%). Since the average durations are the same and average thresholds are within such a pre-determined percentage variance, pointers M and O are considered to be at appropriate positions for silence insertion and step (120) is executed. Specifically, at step (120) pointer N is advanced until it is aligned with pointer M. At step (121) the difference between positions of pointers M and O is calculated to be 50 ms which is the amount of silence that needs to be added to the audio piece currently being pointed at by pointer N. Accordingly, assuming that this difference is within the pre-determined variance then at step (124) the 50 ms of silence is added in front of the audio piece pointed at by pointer N as shown at the front of the audio piece file 27 in FIG. 8. At step (126), pointer N is advanced to the next audio piece and pointers M and O are advanced until they are past pointer N. Since it is not the end of the non-silence blocks, at step (128), another iteration is begun starting with step (118).

If at step (142), it is determined that the average duration and threshold for the combined non-silence groups are still not within the pre-determined variance (i.e. not close enough), then at step (144), it is determined whether either or both of the advanced pointers M and O are positioned on a synchronization marker. If at step (144), it is determined that one of pointers M and O are positioned on a synchronization marker, then at step (146), the other pointer M or O is advanced to the corresponding synchronization point in the corresponding audio file 35 or 39. At this point, pointers M and O are considered to be at appropriate positions for silence insertion and step (120) is executed. Specifically, at step (120) pointer N is advanced until it is aligned with pointer M. At step (121) the difference between positions of pointers M and O is calculated and assuming that this difference is within the pre-determined variance then at step (124) this amount of silence is added in front of the audio piece pointed at by pointer N as shown at the front of the audio piece file 27 in FIG. 8. At step (126), pointer N is advanced to the next audio piece and pointers M and O are advanced until they are past pointer N. Since it is not the end of the non-silence blocks, at step (128), another iteration is begun starting with step (118).

If at step (144), it is determined that neither of pointers M or O are positioned on a synchronization marker, then at step (145) it is determined whether a pre-determined number of non-silence groups have been combined. It should be understood that it is only desirable to combine a certain number of non-silence groups (e.g. up to three). This "context window" is used to account for differences in how audio data is represented within the respective audio files 35 and 39. If the pre-determined limit on group combinations has not been exceeded, then at step (140) the pointers M or O associated with the non-silence group having a shortest duration (or both pointers M and O if the durations are the same) are advanced to the next non-silence group(s), the groups combined, duration and threshold re-averaged, and at step (142), the determination again made whether the average duration and thresholds are within the pre-determined variance.

If at step (145), it is determined that a pre-determined number of non-silence groups have already been combined then the maximum limit of the "context window" obtained by combining non-silence groups has been reached. At this point, it is likely that an artifact has been encountered in either silence detected original audio file 35 and/or silence detected aggregated audio file 39. Artifacts are usually the result of a sharp sound being located in one audio file 35 or 39 but not the other. Accordingly, at step (147), the first pointed-to block(s) are examined to see whether it/they exhibit typical "artifact" type characteristics by determining whether the duration of either first non-silence group is less than a pre-determined artifact length (e.g. 50 ms).

Referring back to FIGS. 4A and 4B, it can be see that the non-silence group on the left of FIG. 4B is a relatively skinny non-silence group that indicates that it may be an artifact. Further, it is positioned a substantial distance away from the non-silence group on the right of FIG. 4B which also indicates this is the case. The specific target non-silence group duration (e.g. 50 ms) will depend on the resolution of the audio block boundaries "X" used within silence detection module 14. If at step (147), artifact duration is detected then at step (149), pointers M and/or O are advanced over the artifact and then step (118) is re-executed. If at step (147), artifact duration is not detected, then at step (148), pointers M and/or O are advanced over the first non-silence groups and step (118) is re-executed.

Finally, at step (126), pointer N is advanced to the next audio piece and pointers M and O are advanced until they move past pointer N. At step (128), it is determined whether pointers M and O have reached the end of the non-silence groups (i.e. whether pointer M has reached end marker in the silence detected original audio file 35 and pointer O has reached the end of the silence detected aggregated audio file 39). If not, then the iterative cycle begins again at step (118) and silence insertion module 16 repeats the matching process for a next set of non-silence groups. If so, then at step (130), the list of recognition result objects originally obtained from speech recognition module 12 with silence inserted (i.e. the silence inserted audio pieces) are examined and specific information is extracted to form the mapping file 15.

The information extracted from the silence inserted audio pieces consists of the position of the starting character of each word relative to the start of the document, the number of characters in each word (with formatting included), the duration of the audio piece that corresponds to the word, and the confidence of the word (as discussed above). It should be understood that the duration of the individual audio pieces also contains the silence that may have been inserted into a given audio piece (i.e. word). This information is stored as 4 bytes for each piece of information. This leads to storing 16 bytes of information per word in the mapping file 15.

Once silence insertion module 16 has completed inserting silence within the audio pieces file 27, the mapping file 15 is assembled for playback on playback device 18. As an illustration, the information in the following table represents the information available after silence insertion module 16 has finished processing an original audio file 25. In the following table, each column represents a listed word.

| Textual Representation | "the" | "quick" | "brown" | "fox" | "." |
|---|---|---|---|---|---|
| Duration of the audio | 200 ms | 345 ms | 134 ms | 234 ms | 400 ms |
| Confidence | 80 | 75 | 90 | 88 | 34 |

The quotation marks in the above-noted table are used to signify the formatting that has been performed on each of the individual words (i.e. the insertion of silence). The resulting mapping file 15 is shown below (only the bold parts are included in this file):

| | Starting character position (ms) | Length of word in characters | Duration of the audio (ms) | Confidence from the recognition engine |
|---|---|---|---|---|
| the | 0 | 4 | 200 | 80 |
| quick | 4 | 6 | 345 | 75 |
| brown | 10 | 6 | 134 | 90 |
| fox | 16 | 3 | 234 | 88 |
| . | 19 | 1 | 400 | 34 |

Figure 9A:
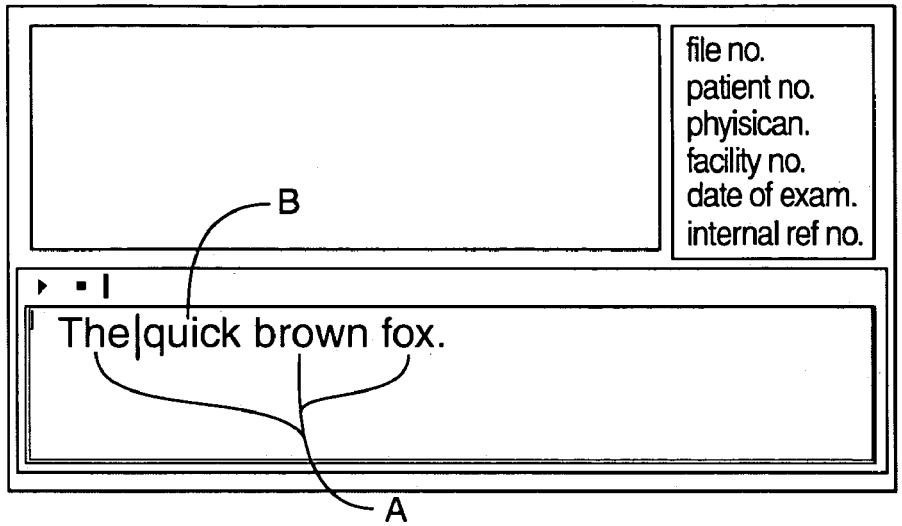
FIGS. 9A, 9B and 9C are screen captures of a graphical user interface (GUI) utilized by the audio processing system.
Figure 9B:
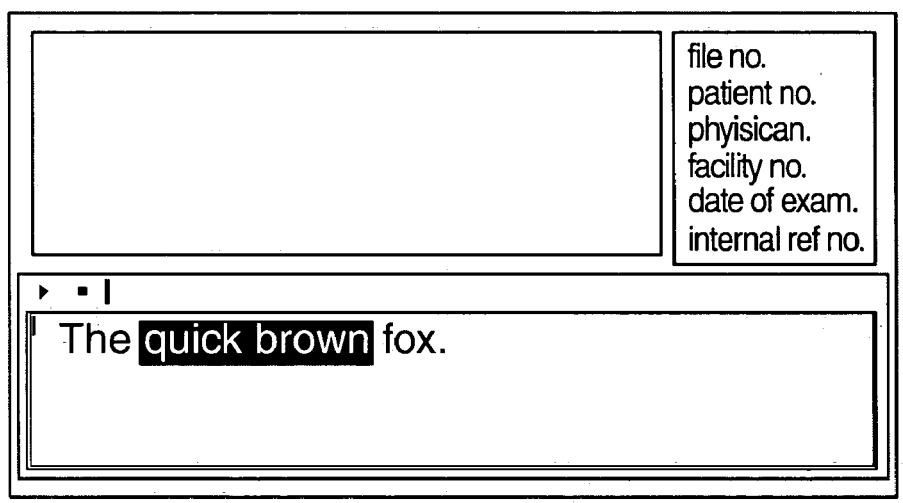
Figure 9C:
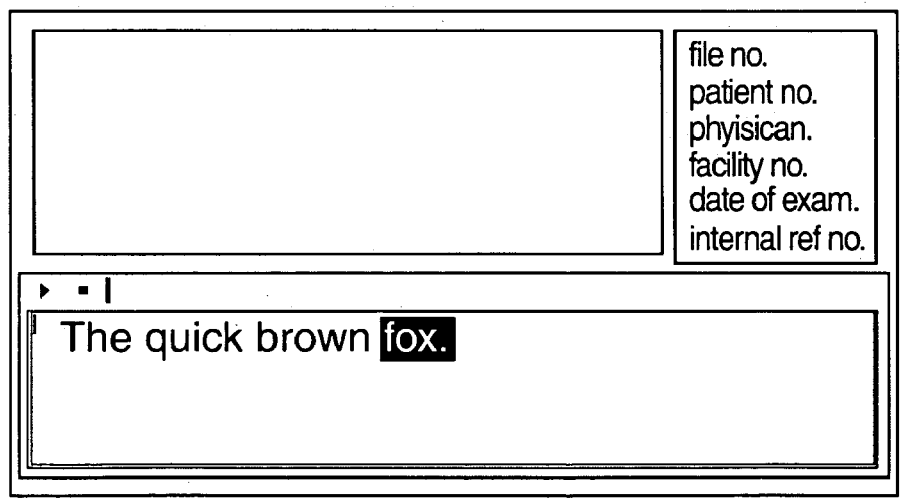

The information from the resulting mapping file 15 is then used by playback device 18 to highlight appropriate text during playback of the original audio file 25 as shown by an example screen display 150 associated with a graphical user interface (GUI) of playback device 18 shown in FIGS. 9A, 9B and 9C.

Specifically, as shown in FIG. 9A, the PLAY and STOP buttons can be used to start and stop playback of the audio file. Words are preferably highlighted two at a time (e.g. "quick brown"). Words can also be printed with various colors that reflect recognition confidence scores as discussed above. For example, the words identified as "A" can be marked with the color green indicating that have been recognized with a high degree of confidence. The words identified as "B" can be marked with the color red indicating that they have been recognized with a low degree of confidence (i.e. words that are either unrecognized or recognized with low confidence). It should be understood that other words that have been recognized with a medium degree of confidence can be highlighted in a different color or font.

As shown on the screen display 150 of FIG. 9A, a transcriptionist 2 will place a highlighting cursor on the word "quick" and then depress the play button. As shown in the screen display 152 of FIG. 9B, the two words "quick brown" are highlighted. It should be understood that as illustrated, it is preferred that two words be highlighted at a time, but that audio processing system 10 is able to highlight any number of words (e.g. three or four). After audio processing system 10 finishes playing the words "quick brown" from the mapping file 15, as shown on screen display 154 of FIG. 9C, the highlighting advances to the next two words, namely "fox." (i.e. "fox" and ".").

There are many different ways to utilize the information contained within mapping file 15, including the use of confidence information. The highlighting of the words synchronously with audio playback can be provided for simultaneous highlighting of two or three words, or with entire sentences, or paragraphs as desired. Based on how many words are to be highlighted, the appropriate words can be identified within the mapping file 15. This is accomplished by obtaining the starting position of the first word to be highlighted with in the full text, then looking up the appropriate start character in the mapping file 15. Using the mapping file 15, the durations of the appropriate words to be highlighted are added together along with the durations of the individual words.

From the example above, where the two words "the quick" are simultaneously highlighted, there will be a total of 10 characters with a duration of 545 ms. A timer would be set to begin after 545 ms and 10 characters would be highlighted on the screen 150. The position of audio playback would be set and playback would occur for 545 ms. After 545 ms, the process is repeated for the next two words. The processing required is low enough that audio playback could continue uninterrupted while the highlighting of the text and setting of timers is occurring. It should be noted that playback can start on any word boundary and not necessarily at the first word in the dictation. By looking up appropriate start characters in the mapping file 15 for a word an audio offset can be determined using the durations of words that precede the desired word for playback.

When audio processing system 10 encounters an unrecognized word, a number of responses can be provided. First, there could be no indication as to the unrecognized word and the audio for the unrecognized word could be coupled with a previous word. Alternatively, some kind of visual queue could be used to indicate that a word was unrecognized such as through the use of varying text or background colors. For example, it would be possible to provide highlighting of a blank area where an unrecognized word occurs using a background colour different from the one being used for recognized (adjoining) words. Also, a word could be inserted and colored to indicate more strongly that a word was unrecognized. For example, the string "<unrecognized>" could be inserted into the text, or any other configurable key word/phrase to draw the transcriptionist 2 attention. Finally, given the confidence numbers found in the recognition results, all words could be color coded to assist transcriptionist 2 identify words where the confidence is less than some configurable ideal. This could lead to all words having a colour scheme (e.g. green words indicate a high degree of confidence; yellow words indicate medium degree of confidence; red words indicate a low degree of confidence i.e. possibly unrecognized words or recognized but low confidence).

It should be understood that many of the specific pre-determined parameters and comparison ranges that are used within audio processing system 10 have been determined by the inventors to be suitable for use with conventional processing equipment and for English language speech. Specifically, the threshold and the dimensions of the audio chunks and blocks utilized within silence detection module 14, the percentage of the chunks required to be over the threshold in order to characterize the associated block, the dimensions of and percentage tolerance utilized within the sliding window 36, the sampling rate utilized, as well as the resolution of data inspected from the sampled data (typically every $5^{th}$ sample is inspected), the percentage ranges utilized within silence insertion module 16 to identify similar non-silence groups are all examples of system parameters which can be adjusted depending on the specific system capacities and performance requirements as well as on the target language. It is contemplated that a recommended set of pre-determined parameters and comparison ranges used within audio processing system 10 could be provided as a set of default settings depending on the specific system capabilities, performance requirements, or language of user 3. The appropriate set of default settings could then be selected depending on these particular application specific conditions.

Audio processing system 10 allows for the efficient synchronization of the playback of an original audio file 25 with recognized textual elements from the original audio file 25 by reducing the associated computation complexity. As previously discussed, by using the representations silence detected original audio file 35 and silence detected aggregated audio file 39 (i.e. sequences of silence and non-silence periods) that are generated by silence detection module 14 (as opposed to using the individual audio samples), it has been determined that a reduction in information of approximately 6000 times can be achieved. Also, the single pass nature of the algorithm utilized by audio processing system 10 prevents repeated examination of data at multiple points. The relevant information from each of silence detected original audio file 35, audio pieces file 27, and silence detected aggregated audio file 39 is used only once during the creation of the silence inserted audio file, rather than multiple times.

As will be apparent to those skilled in the art, various modifications and adaptations of the structure described above are possible without departing from the present invention, the scope of which is defined in the appended claims.

The invention claimed is:

1. An audio processing system for providing synchronized display of recognized text from an original audio file containing speech spoken by a user and playback of the original audio file, said system comprising:
   (a) a speech recognition module for generating recognized text pieces and associated audio pieces from the original audio file;
   (b) a silence insertion module for aggregating the audio pieces into an aggregated audio file;
   (c) a silence detection module for converting the original audio file and the aggregated audio file into a silence detected original audio file and a silence detected aggregated audio file, wherein silent and non-silent groups are identified using a threshold volume;
   (d) said silence insertion module further being adapted to:
      (i) compare the silence detected original audio file with the silence detected aggregated audio file and determine the differences in position of the non-silence group within the respective files;
      (ii) insert silence within the audio pieces according to the differences in position determined in (i) to create silence inserted audio pieces, such that aggregation of the silence inserted audio pieces results in an aggregated silence inserted audio pieces file that substantially corresponds to the original audio file; and
      (iii) utilize the characteristics of the silence inserted audio pieces and the associated recognized text pieces to synchronize the display of the recognized text pieces from the original audio file and the playback of the associated audio pieces from the original audio file.

2. The system of claim 1, wherein said silence detection module further utilizes an adaptive sliding average window register that maintains the average volume of a number of preceding non-silence groups to determine whether a following non-silence group should be considered as non-silence or as silence.

3. The system of claim 1, wherein each of said non-silence groups have a height that corresponds to the average volume of the audio within said blocks.

4. The system of claim 1, wherein the threshold volume is set to reflect the recording environment for the original audio file.

5. The system of claim 1, wherein said silence insertion module is further adapted to:
   (i) assign an original audio marker to a position in front of a non-silence group in the silence detected original audio file and an aggregated marker to a position in front of a non-silence group in the silence detected aggregated audio file;
   (ii) determine if the respective non-silence groups match;
   (iii) determine the difference in position between said original audio marker and said aggregated marker;
   (iii) repeat (i).

6. The system of claim 1, wherein the characteristics of a silence inserted audio piece and an associated recognized text piece include at least one of the group consisting of: the position of the starting character of the text piece in the audio piece relative to the start of original audio file, the number of characters in the text piece, the duration of the audio piece, the confidence of the recognized text piece.

7. The system of claim 1, wherein the silence insertion module synchronizes the display of the recognized text pieces and the playback of the associated audio pieces by utilizing the timing characteristics of the silence inserted audio pieces.

8. The system of claim 7, wherein the silence insertion module synchronizes the display of the recognized text pieces and the playback of the associated audio pieces by highlighting a recognized text piece and at least one adjoining recognized text piece while playing back the audio pieces that correspond to said recognized text piece and at least one adjoining recognized text piece.

9. The system of claim 1, further comprising a terminal coupled to said speech recognition module, said silence detection module and said silence insertion module, said terminal being utilized to obtain said original audio file from the user.

10. The system of claim 1, further comprising a playback device coupled to said silence insertion module for receiving the aggregated silence inserted audio pieces file and for displaying the recognized text pieces and playing back the associated audio pieces in a synchronized manner.

11. An audio processing method for providing synchronized display of recognized text from an original audio file containing speech spoken by a user and playback of the original audio file, said method comprising:
   (a) recognizing the spoken speech within the original audio file and generating recognized text pieces and associated audio pieces;
   (b) aggregating the audio pieces into an aggregated audio file;
   (c) applying silence detection to convert the original audio file and the aggregated audio file into a silence detected original audio file and a silence detected aggregated audio file, wherein silent and non-silent groups are identified using a threshold volume;
   (d) comparing the silence detected original audio file with the silence detected aggregated audio file and determining the differences in position of corresponding non-silence groups within the silence detected original audio file and the silence detected aggregated audio file;
   (e) inserting silence within the audio pieces according to the differences in position of corresponding non-silence groups within the silence detected original audio file and the silence detected aggregated audio file to create silence inserted audio pieces, such that aggregation of the silence inserted audio pieces results in an aggregated silence inserted audio pieces file that substantially corresponds to the original audio file; and
   (f) utilizing the characteristics of the silence inserted audio pieces and the associated recognized text pieces to synchronize the display of recognized text from an original audio file and playback of original audio file.

12. The method of claim 11, wherein step (c) includes the step of utilizing an adaptive sliding average window register to maintain the average volume of a number of preceding non-silence groups to determine whether a following non-silence group should be considered as non-silence or as silence.

13. The system of claim 11, wherein each of said non-silence groups have a height that corresponds to the average volume of the audio within said blocks.

14. The method of claim 11, wherein step (c) further includes determining the threshold volume that reflects the recording environment for the original audio file.

15. The method of claim 11, wherein step (d) further comprises:
   (i) assigning an original audio marker to a position in front of a non-silence group in the silence detected original audio file and an aggregated marker to a position in front of a non-silence group in the silence detected aggregated audio file;
   (ii) determining if the respective non-silence groups match;
   (iii) determining the difference in position between said original audio marker and said aggregated marker;
   (iii) repeat (i).

16. The method of claim 11, wherein the characteristics of a silence inserted audio piece and an associated recognized text piece of step (f) include at least one of the group consisting of: the position of the starting character of the text piece in the audio piece relative to the start of original audio file, the number of characters in the text piece, the duration of the audio piece, the confidence of the recognized text piece.

17. The method of claim 11, wherein step (f) further includes synchronizing the display of the recognized text pieces and the playback of the associated audio pieces by utilizing the timing characteristics of the silence inserted audio pieces.

18. The method of claim 11, wherein step (f) includes synchronizing the display of the recognized text pieces and the playback of the associated audio pieces by highlighting a recognized text piece and at least one adjoining recognized text piece while playing back the audio pieces that correspond to said recognized text piece and at least one adjoining recognized text piece.

19. The method of claim 11, wherein said original audio file is obtained from the user using a terminal.

20. The method of claim 11, wherein the recognized text pieces are displayed and the associated audio pieces are played back in a synchronized manner with the recognized text pieces using a playback device.

* * * * *